United States Patent

Ekert et al.

[11] Patent Number: 5,709,290

[45] Date of Patent: Jan. 20, 1998

[54] MONOTUBE DAMPER VALVE

[75] Inventors: Edward Charles Ekert, Dayton; James Mitchell Pees, Centerville, both of Ohio

[73] Assignee: General Motors Corporation, Detroit, Mich.

[21] Appl. No.: 603,519

[22] Filed: Feb. 20, 1996

[51] Int. Cl.$^6$ .................................. F16F 9/34
[52] U.S. Cl. .................. 188/322.15; 188/322.22
[58] Field of Search ....................... 188/280, 282, 188/322.15, 322.22; 137/854, 856, 493.8

[56] References Cited

U.S. PATENT DOCUMENTS

| | | | |
|---|---|---|---|
| 3,199,636 | 8/1965 | DeCarbon | 188/96 |
| 3,561,575 | 2/1971 | Allinquant | 188/322.15 X |
| 3,592,302 | 7/1971 | Allinquant | 188/281 |
| 3,621,951 | 11/1971 | Schmid | 188/322 |
| 3,747,714 | 7/1973 | DeCarbon | 188/317 |
| 3,827,539 | 8/1974 | Fader et al. | 188/322 |
| 3,831,626 | 8/1974 | Peddinghaus | 188/282 X |
| 3,844,389 | 10/1974 | DeCarbon | 188/322 |
| 3,957,140 | 5/1976 | Overkott | 188/322.15 X |
| 4,045,009 | 8/1977 | Pees | 188/282 X |
| 4,724,937 | 2/1988 | Fannin et al. | 188/319 |
| 4,899,855 | 2/1990 | DeCarbon | 188/322.15 |
| 4,934,667 | 6/1990 | Pees et al. | 267/64.21 |
| 5,018,608 | 5/1991 | Imaizumi | 188/322.15 |
| 5,180,186 | 1/1993 | Charles et al. | 280/714 |
| 5,259,294 | 11/1993 | May | 188/322.22 X |
| 5,345,970 | 9/1994 | Leyderman et al. | 137/856 |
| 5,425,398 | 6/1995 | Moradmand et al. | 137/854 |
| 5,547,050 | 8/1996 | Beck | 188/322.15 |
| 5,586,874 | 12/1996 | Hashimoto et al. | 137/856 X |

FOREIGN PATENT DOCUMENTS

| 472033 | 7/1954 | Italy . |
|---|---|---|
| 58-121368 | 7/1983 | Japan . |

*Primary Examiner*—Robert J. Oberleitner
*Assistant Examiner*—Pamela J. Lipka
*Attorney, Agent, or Firm*—Jeffrey A. Sedlar

[57] ABSTRACT

A monotube damper valve is provided which is capable of operating with a higher degree of preloading and a greater extent of disc deflection due to the provision of compression and extension stop surfaces which uniformly support the disc in its naturally deflected state at both limits of deflection travel.

5 Claims, 3 Drawing Sheets

5,709,290

MONOTUBE DAMPER VALVE

BACKGROUND OF THE INVENTION

The present invention relates to a valve for a monotube damper and more particularly, to a bi-directional monodisc style valve for a vehicle suspension damper.

Conventional vehicle suspension dampers typically consist of direct double-acting telescopic hydraulic passive dampers. They are generally described as either a shock absorber or a strut. A primary purpose of shock absorbers is to dampen oscillations of the vehicle suspension spring. This is accomplished by converting kinetic energy in the form of motion between sprung and unsprung masses of a vehicle into heat and then dissipating the heat. Struts also serve this capacity and in addition, support reaction and side-load forces on the suspension.

Typical dampers are hydraulic devices using oil as the medium for converting motion into heat. As the damper is cycled, a piston is forced to move in extension and compression directions through the oil that is contained within a cylinder tube. This creates pressure within a portion of the cylinder tube and a consequent pressure drop across the piston. During an extension stroke, high pressure is created in the extension chamber of the cylinder tube above the piston forcing oil to flow through the valving in the piston. During a compression stroke, high pressure is created in the compression chamber of the cylinder tube below the piston forcing oil to flow back through the piston's valving. As the piston moves an amount of oil substantially equal to the volume of the piston rod entering or exiting the cylinder tube is forced through the piston valving or through a compression valve on the base of the cylinder tube in combination with the piston valving.

As oil is forced to flow through the orifices in the piston valve and/or the compression valve it is heated. Through this mechanism dampers dissipate energy stored by the vehicle's suspension spring. The extent to which the oil is heated and consequently the amount of energy dissipated is controlled by the size of the openable orifices in the valving and the amount of flow forced through the valving.

Damping force is a common measurement of the performance of a damper. The opening characteristics of the piston valve in combination with the orifices through the piston contribute to the damping force characteristics of a given damper. Generally, this valving is tuned to achieve preselected vehicle performance criteria. One type of known piston valving includes a single annular monodisc which substantially closes the flow passages through the piston when in a non-deflected condition.

During a damper compression stroke, as pressure increases in the compression chamber, the monodisc deflects at its outer periphery thus opening a flow path through the piston and providing damping force which operates against the flow of fluid through the piston. During an extension stroke, as pressure builds in the extension chamber, the monodisc deflects at its inner periphery opening a flow passage through the piston and providing damping force which operates against the flow of fluid through the piston. The amount of damping force provided is determined by various factors including the inherent characteristics of the monodisc to resist deflection and the extent to which the monodisc deflects. Seemingly minor variations in the specific design features of such piston valving results in significant changes in the performance characteristics of the damper assembly as a whole.

SUMMARY OF THE INVENTION

According to an aspect of the present invention a suspension damper with a monodisc style piston valve arrangement is provided that is capable of operating with a greater extent of preloading than conventionally possible and which provides a higher degree of disc deflection than conventional valve designs. In discovering how to provide these enhanced performance capabilities in accordance with the present invention, it has been found that conventionally designed monodisc style valve assemblies can yield to a deformed condition under an aggressive loading situation, which may be permanent, significantly altering the designed-in performance characteristics of the damper assembly.

Therefore, a suspension damper according to the present invention includes a piston slidably and sealingly carried within a cylinder tube with a piston rod connected to the piston. The piston carries a monodisc style valve assembly which is bi-directional in operation. The outer periphery of the monodisc is deflectable during a compression stroke of the piston and the inner periphery of the monodisc is deflectable during an extension stroke of the piston. This allows alternately directed fluid flow through the piston flow orifices in response to reciprocal movement of the piston within the damper.

During compression and extension strokes of the piston, the monodisc is supported at its inner periphery and outer periphery respectively, and acts somewhat like a cantilevered member. Because the fluid force applied to the monodisc has been discovered to create a tendency to bend the monodisc if it is unevenly supported, compression and extension disc stops are provided by the present invention which uniformly contact the monodisc so that it remains substantially flat for all load conditions. Because the rigid compression and extension stops provide support for the monodisc, plastic deformation of the element is prevented.

Additionally, since the monodisc can operate under greater fluid pressure conditions without the threat of deformation, a significantly greater initial preload may be imparted to the monodisc to inhibit deflection of the monodisc during a stroke of the piston and thus providing a higher level of damping force. Further, the monodisc is capable of operating over greater deflection distances than have been conventionally achievable, while continuing to provide pre-designed performance characteristics over the life of the damper. This is significant because a sufficiently large flow area through the valve is maintained even with a greater degree of preloading.

DETAILED DESCRIPTION OF THE PRESENTLY PREFERRED EMBODIMENT

Figure 1A:
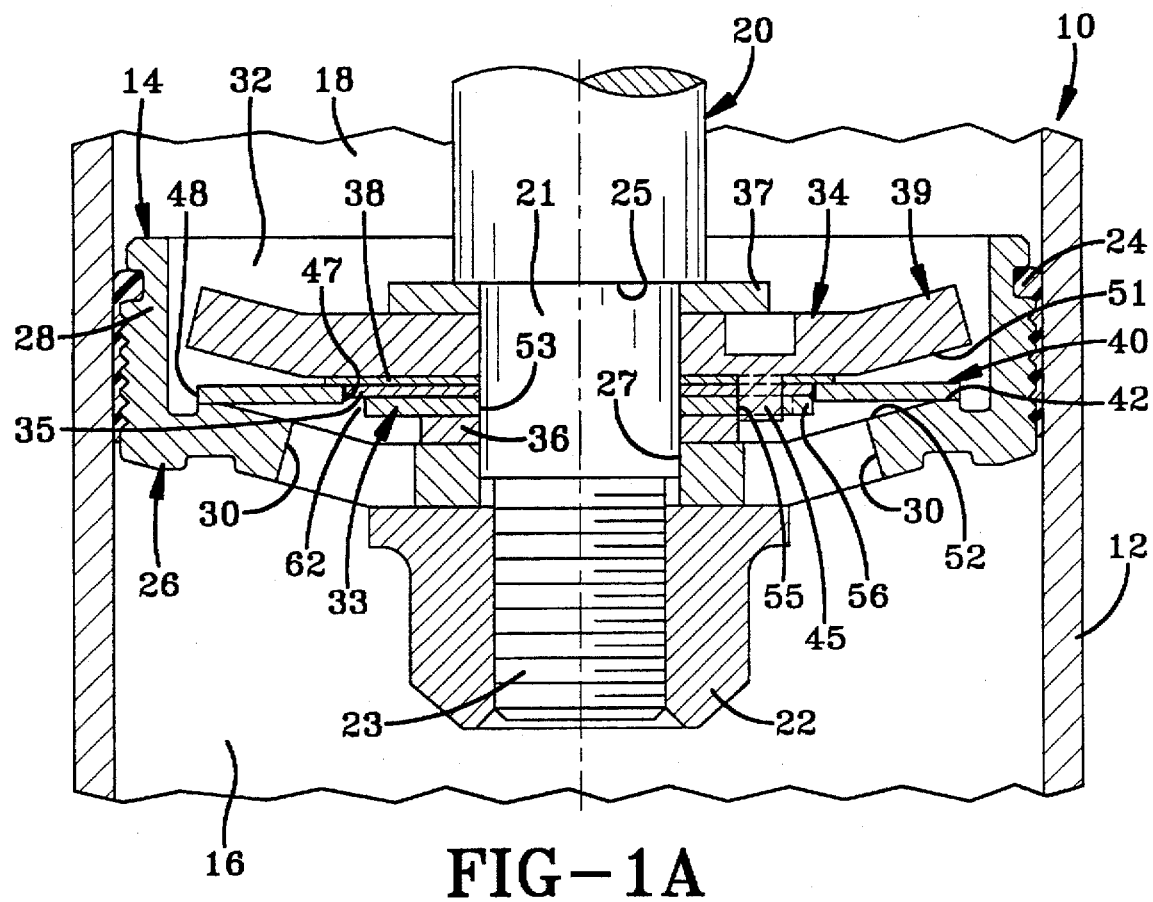
FIG. 1A is a fragmentary cross sectional view of the piston area of a damper taken generally through the plane indicated by the line 1A in FIG. 1B.

Referring to the drawings, illustrated in FIG. 1A is the piston area of a damper designated in the aggregate as 10. Damper 10 is embodied as a monotube-type damper and includes a cylinder tube 12. A piston assembly 14 is slidably and sealingly carried in cylinder tube 12 dividing the interior thereof into a compression chamber 16 and an extension chamber 18.

The piston assembly 14 is securely connected to turned down segment 21 of piston rod 20 and is maintained thereon by nut 22 which is secured on threaded segment 23. The piston rod 20 extends through the extension chamber 18 and exits the cylinder tube 12 for attachment to the body of a vehicle (not illustrated).

The cylinder tube 12 is conventionally adapted for connection to the wheel assembly (not illustrated) which is associated with the vehicle and therefore, in response to relative movement between the wheel assembly and the vehicle the piston assembly 14 reciprocates within the cylinder tube 12. A combination bearing and seal element 24 of a low friction material is carried by the piston assembly 14 and provides a mating engagement with the cylinder tube 12.

The piston assembly 14 includes a piston body 26 with a cylindrical skirt 28. A series of passageways, representative of which is passageway 30, are distributed about the piston body 26 and extend therethrough. The piston body 26 forms a cavity 32 which is radially bounded by the skirt 28 and which is open to the extension chamber 18. The piston valve assembly 34 is carried within the cavity 32 and is secured between annular shoulder 25 of piston rod 20 and the piston body 26.

The valve assembly 34 includes a retainer 39 which is pressed onto turned down segment 21 in combination with a washer spacer 37 which positions the retainer 39 an appropriate distance away from the piston body 26. A bearing washer 38 and center washer 35 are carried on legs of retainer 39 representative of which is leg 45. A guide washer 33 fits onto the turned down segment 21 against center washer 35 and held by legs 45. An annular spacer 36 is pressed onto turned down segment 21 against guide washer 33 securing valve assembly 34 between the annular shoulder 25 and the piston body 26.

An annular spring steel valve element designated as monodisc 40 is carried between bearing washer 38 and annular bearing 42, which is an integral part of piston body 26. Due to the spring-like nature of the monodisc 40 its inner perimeter 47 is biased against the bearing washer 38 and its outer perimeter 48 is biased against the annular bearing 42.

Figure 1B:
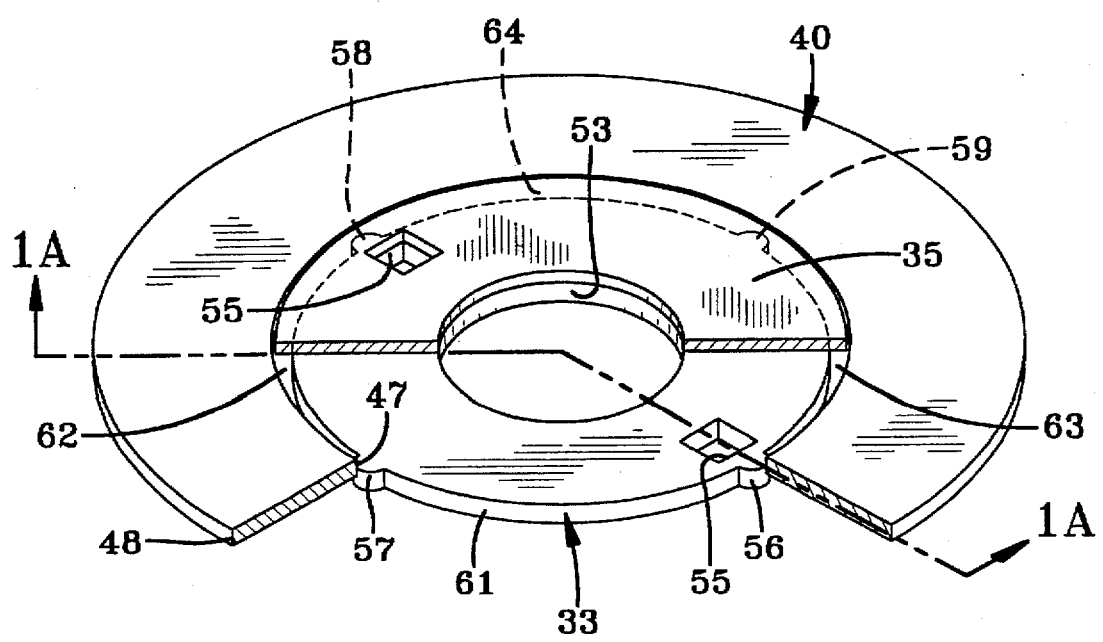
FIG. 1B is a fragmentary perspective view of the valve area of a piston.

The guide washer 33 is illustrated in greater detail in FIG. 1B. The opening 53 permits the guide washer 33 to be loosely received over turned down segment 21 of rod 20. The opening 55 receives the leg 45 of retainer 39. The four radially extending projections 56–59 guide the monodisc 40 when it deflects during an extension stroke of the damper 10 to maintain a centered orientation within the piston assembly 14. The four spaces 61–64, around the outside of guide washer 33 provide a continuously open area for fluid flow around the inside diameter of the monodisc 40.

Figure 2:
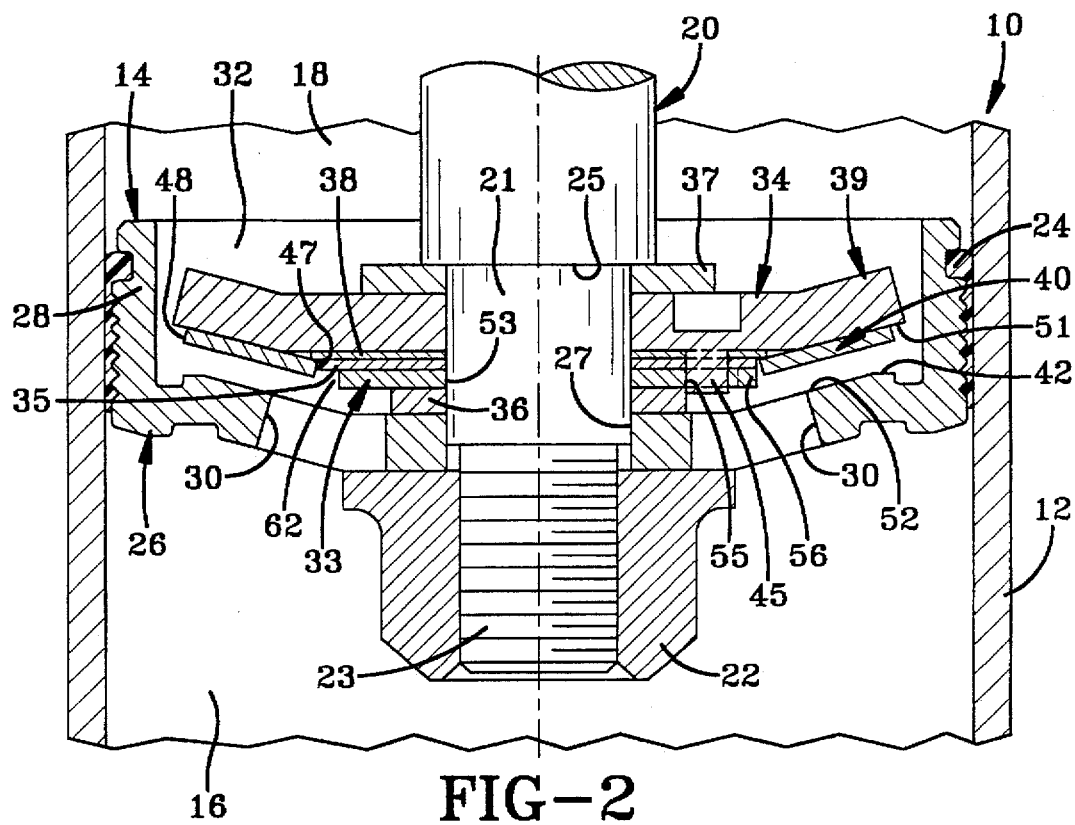
FIG. 2 is a fragmentary cross sectional view of the piston area of the damper of FIG. 1 shown in a compression stroke.

Referring to FIG. 2, reciprocal motion of the piston assembly 14 in the cylinder tube 12 in the compression direction is illustrated. An increase in pressure in the compression chamber 16 is created wherein the monodisc 40 springs open creating a sufficiently large flow passage through the piston assembly 14 between the compression chamber 16 and the extension chamber 18 permitting a flow of fluid therethrough. This provides for compensation of fluid into the extension chamber 18 which is increasing in size due to the compression stroke of the piston assembly 14 within the cylinder tube 12. The outer perimeter 48 of the monodisc 40 separates from annular bearing 42 with the inner perimeter 47 remaining supported on the bearing washing 38.

The monodisc 40 is deflectable to the maximum travel position shown wherein the monodisc 40 is positioned in a substantially flat orientation against compression stop surface 51 of retainer 39. The compression stop surface 51 is oriented such that the monodisc 40 uniformly mates therewith with the inner perimeter 47 supported in a spaced away position from retainer 39 on annular bearing 42.

During deflection travel of the monodisc 40, the outer perimeter 48 travels through an arc between the annular bearing 42 and the compression stop surface 51. Unevenly supported deflection of the monodisc 40 would cause the length thereof between the inner perimeter 47 and the outer perimeter 48 to bend in response to the fluid pressure applied thereto. To remain below maximum stress levels in the monodisc 40 the deflection distance between the annular bearing 42 and the compression stop surface 51 is limited in conventional damper assemblies.

Providing the uniformly flat compression stop surface 51 of the present invention permits increasing the deflection distance permissible between annular bearing 42 and compression stop surface 51 without surpassing the maximum stress level of monodisc 40. This is due to the fact that during the deflection travel of the monodisc 40 it is simply supported at its inner perimeter 47 and therefore, deflects linearly. The linear deflection is maintained by the uniform support provided by compression stop surface 51 which is designed to mate with the monodisc 40 without imparting a curved deflection to the monodisc 40.

Figure 3:
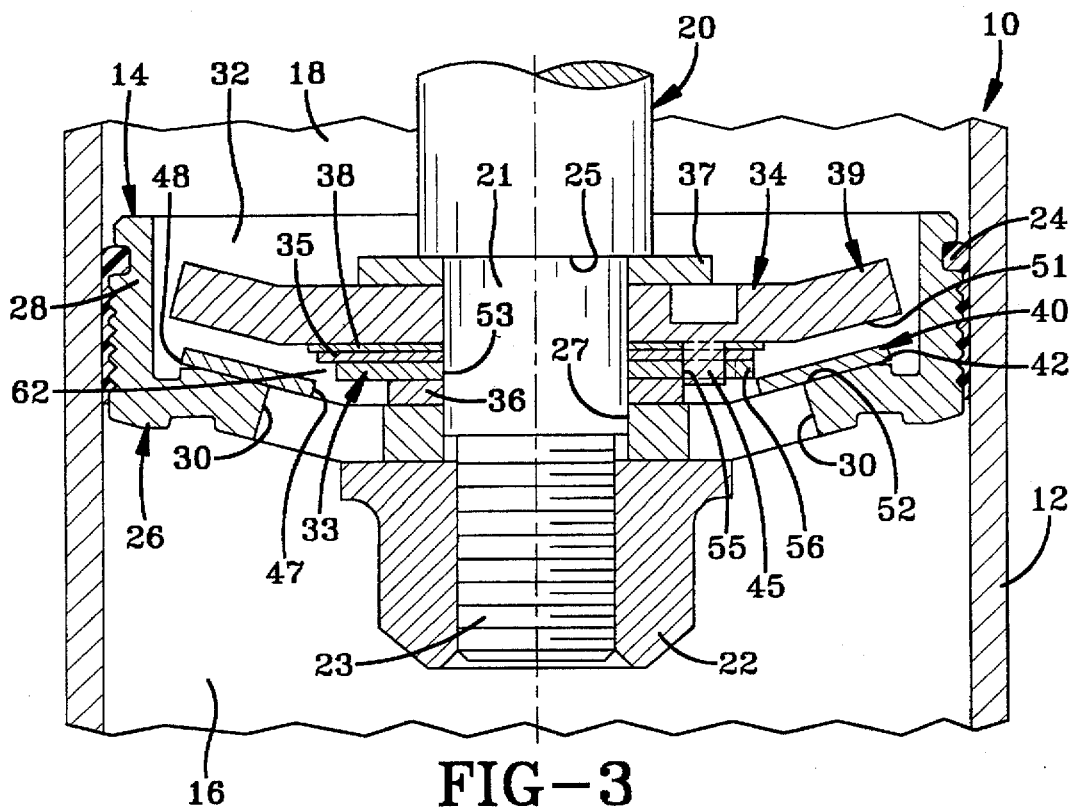
FIG. 3 is a fragmentary cross sectional view of the suspension damper of FIG. 1 shown in an extension stroke.

Referring to FIG. 3, the damper 10 is shown with the piston assembly 14 moving in an extension direction within the cylinder tube 12. An increase in pressure in the extension chamber 18 causes the inner perimeter 47 of the monodisc 40 to deflect downward opening a flow path through the piston assembly 14.

The area of the monodisc 40 adjacent the perimeter 48 is supported by the interior edge of the annular bearing 42 and, at the maximum extent of travel of the monodisc 40, it is uniformly supported on the extension stop surface 52 of the piston body 26. During deflection, the monodisc 40 is simply supported near its outer perimeter 48 and thus deflects linearly. This linear orientation is maintained as it mates with compression stop surface 51. The shape of the stop surface 51 maintains the monodisc 40 in its naturally deflected state and avoids the imparting of stresses to the monodisc 40, beyond the maximum level of the material strength.

Through means of the foregoing structure wherein the monodisc 40 is maintained well within the maximum stress limits of its construction, a means of increasing the preload imparted to the monodisc 40 is provided up to 2.5 times greater than the amount of preload that can be imparted to a conventionally designed monodisc valve assembly. In addition, it has been found that the total compression deflection that is made possible by the present invention without exceeding the maximum stress levels of the monodisc 40 are more than twice the maximum allowable with conventionally designed monodisc assemblies.

Figure 4:
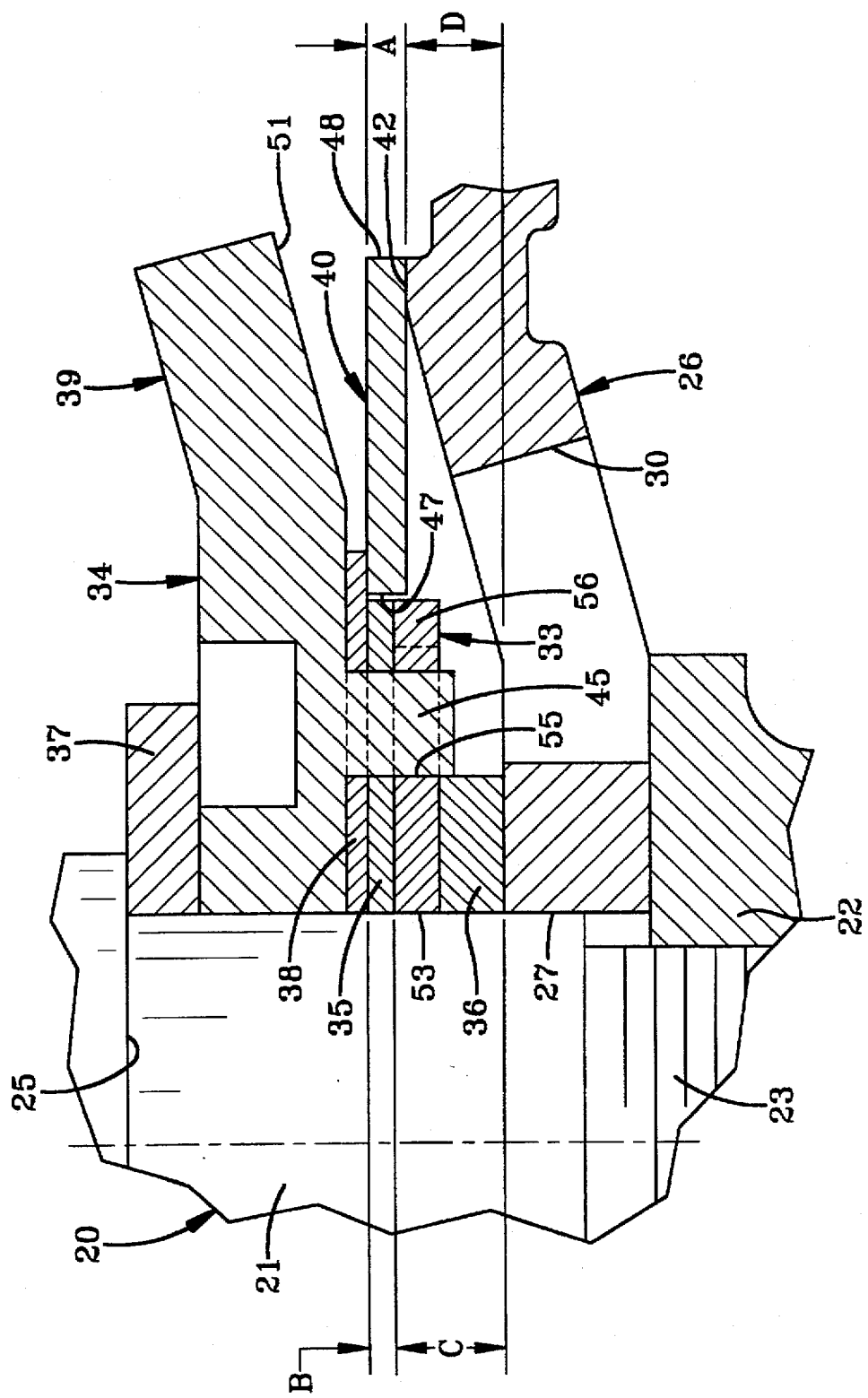
FIG. 4 is a detailed illustration of the monodisc valve area of the damper of FIG. 1.

Referring to FIG. 4, the method of imparting a preload to the monodisc 40 of the present invention is illustrated. The level of preload is determined by the equation (D+A)−(C+B). In this relationship "D" represents the amount of offset between the annular bearing 42 and the top of the piston body 26 at its inner perimeter 27; "A" represents the thickness of the monodisc 40; "C" represents the thickness of the guide washer 33 and annular spacer 36; and "B" represents the thickness of the center washer 35. Therefore, the inner perimeter 47 of the monodisc 40 is deflected downward a distance, defined by the above equation, below the outer perimeter 48 of the monodisc 40. With the extent of preload that may be imparted to the monodisc 40 by means of the present invention a substantially greater damping force is provided during a compression stroke of the damper 10 then could be provided through a conventionally constructed valve assembly.

What is claimed is:

1. A monotube damper valve comprising:

a piston with a piston body having an annular bearing and an extension stop surface;

a piston rod connected to the piston body;

a retainer having a compression stop surface carried about the piston rod adjacent the piston body;

a bearing washer carried about the piston rod near the retainer; and a bi-directional monodisc valve element having an inner perimeter supported by the bearing washer and an outer perimeter supported by the annular bearing in an at-rest condition wherein during a compression stroke of the piston body the monodisc valve element is movable to a maximum compression deflected position wherein it is uniformly supported by the compression stop surface and wherein during an extension stroke of the piston body the monodisc valve element is movable to a maximum extension deflected position wherein it is uniformly supported by the extension stop surface; wherein the compression stop surface is substantially parallel in orientation relative to the extension stop surface.

2. A monotube damper valve according to claim 1 wherein in a maximum compression deflected position during a compression stroke of the piston body the monodisc valve element is supported at its inner perimeter by the bearing washer and is substantially uniformly supported on a flat surface of the retainer which is disposed in a linear orientation extending from the outer lower perimeter of the bearing washer.

3. A monotube damper valve comprising:

a piston with a piston body having an annular bearing and an extension stop surface;

a piston rod connected to the piston body;

a retainer having a compression stop surface carried about the piston rod adjacent the piston body;

a bearing washer carried about the piston rod near the retainer; and a bi-directional monodisc valve element having an inner perimeter supported by the bearing washer and an outer perimeter supported by the annular bearing in an at-rest condition wherein during a compression stroke of the piston body the monodisc valve element is movable to a maximum compression deflected position wherein it is uniformly supported by the compression stop surface and wherein during an extension stroke of the piston body the monodisc valve element is movable to a maximum extension deflected position wherein it is uniformly supported by the extension stop surface; wherein the compression stop surface is substantially parallel in orientation relative to the extension stop surface; further comprising a guide washer having a plurality of radially extending projections with spaces adjacent the projections, the guide washer carried about the piston rod such that the projections guide the inner perimeter of the monodisc valve element during a compression stroke of the piston body maintaining the monodisc valve element in a centered condition within the piston body with the spaces providing an open area for fluid flow past the inner perimeter of the monodisc valve element.

4. A monotube damper valve comprising:

a piston with a piston body having an annular bearing and an extension stop surface;

a piston rod connected to the piston body;

a retainer having a compression stop surface carried about the piston rod adjacent the piston body;

a bearing washer carried about the piston rod near the retainer; and a bi-directional monodisc valve element having an inner perimeter supported by the bearing washer and an outer perimeter supported by the annular bearing in an at-rest condition wherein during a compression stroke of the piston body the monodisc valve element is movable to a maximum compression deflected position wherein it is uniformly supported by the compression stop surface and wherein during an extension stroke of the piston body the monodisc valve element is movable to a maximum extension deflected position wherein it is uniformly supported by the extension stop surface; wherein the compression stop surface is substantially parallel in orientation relative to the extension stop surface; wherein the piston rod includes an annular shoulder, wherein the piston body includes a cylindrical skirt and has a series of passageways extending through the piston body and wherein the piston body forms a cavity which is radially bounded by the skirt, wherein the monodisc valve element is carried within the cavity and is secured between the annular shoulder of piston rod and the piston body and normally substantially closes the series of passageways, and further comprising:

a retainer having a plurality of legs carried in the cavity and about the piston rod near the annular shoulder;

a washer spacer carried in the cavity and about the piston rod which positions the retainer a distance away from the annular shoulder;

a bearing washer carried in the cavity and about the piston rod on the legs of the retainer;

a center washer carried in the cavity and about the piston rod on the legs of retainer adjacent the center washer, the center washer maintaining the monodisc valve element in a centered position; and an annular spacer carried in the cavity and about the piston rod between the center washer and the piston body such that the monodisc valve element carries a preload by being biased between the piston body and the bearing washer.

5. A monotube damper valve comprising:

a piston with a piston body having an annular bearing and an extension stop surface;

a piston rod connected to the piston body;

a retainer having a compression stop surface carried about the piston rod adjacent the piston body;

a bearing washer carried about the piston rod near the retainer;

a bi-directional monodisc valve element having an inner perimeter supported by the bearing washer and an outer perimeter supported by the annular bearing in an at-rest condition; and a guide washer having a plurality of radially extending projections with spaces adjacent the projections, the guide washer carried about the piston rod such that the projections guide the inner perimeter of the monodisc valve element during a compression stroke of the piston body with the spaces providing an open area for fluid flow past the inner perimeter, wherein movement of the monodisc valve element is limited by the compression stop surface and the monodisc valve element is uniformly supported at the compression stop surface and wherein during an extension stroke of the piston body movement of the monodisc valve element is limited by the extension stop surface and the monodisc valve element is uniformly supported at the extension stop surface.

* * * * *